United States Patent
Ersbo et al.

(10) Patent No.: US 11,979,359 B2
(45) Date of Patent: May 7, 2024

(54) REMOTE INTERFERENCE MITIGATION FOR PHYSICAL UPLINK SHARED CHANNEL (PUSCH)

(71) Applicant: Telefonaktiebolaget LM Ericsson (publ), Stockholm (SE)

(72) Inventors: Petter Ersbo, Uppsala (SE); Naga Vishnu Kanth Irukulapati, Gothenburg (SE); Sebastian Faxér, Järfälla (SE); Håkan Björkegren, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/278,850

(22) PCT Filed: Oct. 1, 2019

(86) PCT No.: PCT/SE2019/050945
§ 371 (c)(1),
(2) Date: Mar. 23, 2021

(87) PCT Pub. No.: WO2020/071985
PCT Pub. Date: Apr. 9, 2020

(65) Prior Publication Data
US 2022/0052832 A1      Feb. 17, 2022

Related U.S. Application Data

(60) Provisional application No. 62/740,658, filed on Oct. 3, 2018.

(51) Int. Cl.
*H04L 5/14* (2006.01)
*H04L 1/1812* (2023.01)
*H04L 5/00* (2006.01)

(52) U.S. Cl.
CPC .......... *H04L 5/1469* (2013.01); *H04L 1/1819* (2013.01); *H04L 5/0044* (2013.01); *H04L 5/0062* (2013.01)

(58) Field of Classification Search
CPC ... H04L 5/1469; H04L 1/1819; H04L 5/0044; H04L 5/0062; H04L 5/0046
See application file for complete search history.

(56) References Cited

U.S. PATENT DOCUMENTS

2018/0167932 A1    6/2018   Papasakellariou
2018/0269898 A1    9/2018   Sun et al.
(Continued)

FOREIGN PATENT DOCUMENTS

CA     3052414 A1     9/2018
EP     3621345 A1 *   3/2020   ........... H04L 1/0003

OTHER PUBLICATIONS

Zhu, Xipeng, "Remote Interference Determination Assistance", Jul. 30, 2018, Qualcomm, p. 18, paragraph 72 (Year: 2018).*
(Continued)

*Primary Examiner* — Ian N Moore
*Assistant Examiner* — Latresa A McCallum
(74) *Attorney, Agent, or Firm* — Weisberg I.P. Law, P.A.

(57) ABSTRACT

Embodiments include exemplary methods and/or procedures for receiving a physical uplink shared channel (PUSCH) in a cell of a time-division-duplexed (TDD) radio access network (RAN). Embodiments include determining whether remote base station interference is present in uplink transmissions in the cell and, based on the determining result, configuring activation or deactivation of code block group (CBG) based retransmissions in the cell, sending control messages to one or more UEs in the cell, for applying the configuration, and decoding subsequent PUSCH transmissions received from the one or more UEs based on the
(Continued)

configuration. Embodiments also include network nodes configured to perform the exemplary methods and/or procedures.

13 Claims, 9 Drawing Sheets

(56) References Cited

U.S. PATENT DOCUMENTS

| | | | |
|---|---|---|---|
| 2018/0270022 A1* | 9/2018 | Sun | H04L 1/1887 |
| 2018/0270705 A1* | 9/2018 | Sun | H04L 1/1614 |
| 2018/0278368 A1 | 9/2018 | Kim et al. | |
| 2018/0287691 A1* | 10/2018 | Jalali | H04W 24/02 |
| 2018/0287745 A1* | 10/2018 | Sun | H04L 1/1864 |
| 2019/0053254 A1* | 2/2019 | Zhang | H04W 72/23 |
| 2019/0150181 A1* | 5/2019 | Kim | H04L 1/1896 |
| | | | 370/329 |
| 2020/0036500 A1* | 1/2020 | Zhu | H04W 72/21 |
| 2021/0385035 A1* | 12/2021 | Ghozlan | H04L 5/14 |

OTHER PUBLICATIONS

"Reference Signal Design With Flexible Bandwidth for Remote Interference Management in Fifth Generation (5G) Networks", Hassan Ghozlan, Qian Li, Dawei Ying, Geng Wu Sep. 28, 2018 (Year: 2018).*

International Search Report and Written Opinion dated Jan. 22, 2020 for International Application No. PCT/SE2019/050945 filed on Oct. 1, 2019, consisting of 11-pages.

3GPP TSG RAN WG1 NR Ad-Hoc#2 R1-1710876; Title: CBG based HARQ for NR; Agenda Item: 5.1.3.3.4.1; Source: InterDigital, Inc.; Document for: Discussion, Decision; Date and Location: Jun. 27-30, 2017, Qingdao, P.R. China, consisting of 4-pages.

3GPP TSG-RAN WG1 Meeting #93 R1-1806255; Title: HARQ enhancements for NR-U; Agenda Item: 7.6.4.3; Source: Ericsson; Document for: Discussion, Decision; Date and Location: May 21-25, 2018, Busan, Korea, consisting of 5-pages.

3GPP TSG RAN WG1 Meeting #94bis R1-1810331; Title: Consideration on mechanisms for improving network robustness; Agenda Item: 7.2.5.2; Source: ZTE; Document for: Discussion and Decision; Date and Location: Oct. 8-12, 2018, Chengdu, China, consisting of 9-pages.

3GPP TS 38.214 V16.4.0; 3rd Generation Partnership Project: Technical Specification Group Radio Access Network; NR; Physical layer procedures for data (Release 16); Dec. 2020, consisting of 169-pages.

EPO Communication with Supplementary European Search Report dated Jun. 3, 2022 for Patent Application No. 19869931.6, consisting of 8-pages.

3GPP TSG RAN WG1 Meeting #94bis R1-1810272; Title: Discussion on configured grant for NR unlicensed operation; Agenda Item: 7.2.2.4.4; Source: LG Electronics: Document for: Discussion and decision; Date and Location: Oct. 8-12, 2018, Chengdu, China, consisting of 5-pages.

Chinese Office Action and Search Report with English Summary translation dated Feb. 18, 2024 for Patent Application No. 201980065708.6, consisting of 14-pages.

3GPP TSG RAN WG1 Meeting #94 R1-1808326; Title: Consideration on reference signal design for remote interference management; Agenda Item: 7.2.5.2; Source: ZTE; Document for: Discussion and Decision; Date and Location: Aug. 20-24, 2018, Gothenburg, Sweden, consisting of 10 pages.

3GPP TSG RAN WG1 Meeting #94bis R1-1810332; Title: Consideration on mechanism for identifying strong gNB interference; Agenda Item: 7.2.5.3; Source: ZTE; Document for: Discussion and Decision; Date and Location: Oct. 8-12, 2018, Chengdu, China, consisting of 6 pages.

3GPP TSG-RAN WG3 #101bis R3-185515; Title: Coordinated RS Transmission; Agenda Item: 22.2; Source: Qualcomm Incorporated; Document for: Approval; Date and Location: Oct. 8-12, 2018, Chengdu, China, consisting of 3 pages.

* cited by examiner ized and coordinated TDD RANs operated by different operators. This includes RANs operating on the same frequency (e.g., in an adjacent geographic area or country), or on different frequencies (e.g., on an adjacent carrier frequency in the same geographic area). This can be done by coordinating UL and DL periods based on a common time reference such as a global navigation satellite system (e.g., GPS).

REMOTE INTERFERENCE MITIGATION FOR PHYSICAL UPLINK SHARED CHANNEL (PUSCH)

CROSS-REFERENCE TO RELATED APPLICATIONS

This application is a Submission Under 35 U.S.C. § 371 for U.S. National Stage Patent Application of International Application No.: PCT/SE2019/050945, filed Oct. 1, 2019 entitled "REMOTE INTERFERENCE MITIGATION FOR PHYSICAL UPLINK SHARED CHANNEL (PUSCH)," which claims priority to U. S. Provisional Application No. 62/740,658, filed Oct. 3, 2018, the entireties of both of which are incorporated herein by reference.

TECHNICAL FIELD

The present invention generally relates to wireless communication networks, and particularly relates to improving reception of uplink channels in the presence of interference.

BACKGROUND

Wireless cellular networks are built up of cells, where each cell defines a certain coverage area and is served by a radio base station (or "BS" for short). The communication between base stations and terminals/user equipment (UE) in a cell is performed wirelessly using either paired or unpaired resources in a frequency spectrum. In case of paired spectrum, the downlink (DL, i.e., BS to UE) and uplink (UL, i.e., UE to BS) communications from a single BS use separate (paired) frequency resources but can occur simultaneously, which is often referred to as Frequency Division Duplexing (FDD). In case of unpaired spectrum, the DL and UL use the same frequency resources but occur sequentially, which is often referred to as Time Division Duplexing (TDD).

In TDD arrangements, the DL and UL portions are typically separated by guard periods (GPs), which can serve several purposes. For example, the processing circuitry at the BS and UE requires sufficient time to switch between transmission and reception. Even so, this is typically a fast procedure and does not significantly contribute to a GP size/duration requirement. Typically, there is one GP at a DL-to-UL switch and one GP at a UL-to-DL switch. However, the GP at the UL-to-DL switch can generally be neglected since it only needs to give enough time to allow the BS and the UE to switch roles between reception and transmission, which is typically small.

The UL-to-DL switch GP, however, must be sufficiently large to allow a UE to receive a (time-delayed) DL grant scheduling the UL transmission, and to transmit the UL signal with proper timing advance (TA) to compensate for the propagation delay, such that it is received at the BS in alignment with the BS's timing configuration. In some cases, the GP at the UL-to-DL switch can be created with an offset to the TA. As such, the GP should be larger than two times the propagation time to the BS of a signal transmitted by a UE at the cell edge; otherwise, the UL and DL signals in the cell will interfere. Typically, GP can be chosen in direct proportion to cell size.

Furthermore, wide-area TDD radio access networks (RANs) can be planned and coordinated such that all cells use the same, or similar, nominal configurations of UL and DL periods, and are synchronized to a common time reference. In this manner, UL and DL periods start at the same time in different cells, which avoids UL-DL interference among the different cells. Examples of UL-DL interference include BS-to-BS interference (i.e., one BS transmitting downlink in one cell interfering with another BS received signals in another cell) and UE-to-UE interference (i.e., one UE transmitting in one cell interfering with another UE receiving signals in another cell).

Furthermore, it can be possible and beneficial to avoid UL-DL interference by coordinating and/or synchronizing multiple TDD RANs operated by different operators. This includes RANs operating on the same frequency (e.g., in an adjacent geographic area or country), or on different frequencies (e.g., on an adjacent carrier frequency in the same geographic area). This can be done by coordinating UL and DL periods based on a common time reference such as a global navigation satellite system (e.g., GPS).

Even in a synchronized and coordinated TDD RAN, where UL and DL periods are aligned and identical in all cells, there may still be interference between uplink and downlink due to propagation delays. The effect of the delayed interfering signals can depend on the pathloss of the radio channel between the transmitter and the receiver, including the impact of the antennas. As such, one needs to also select suitable GP that not only accounts for propagation delays and synchronization errors within a single cell, but also gives sufficient protection between different cells. It can be particularly important to select suitable GP to avoid UL-DL interference between base stations, as discussed above.

FIG. 1 is a high-level diagram illustrating the effect of GP selection on mitigating and/or avoiding UL-DL interference between base stations. Two base stations (A and V) are time-synchronized but separated a distance d, corresponding to a signal propagation delay $\tau(d)$. The timing diagram shows the relative timing, at BS V's antenna, of the DL signals transmitted by both base stations. Even though both base stations cease their DL transmission at the same time, due to the propagation delay, the signal at base station V from base station A will end later. As can be seen, however, the selected GP is larger than the delay $\tau(d)$ so that BS A's DL transmission (as seen by BS V's antenna) will cease before the BS V begins UL reception.

The selection of GP size/length depends on RAN deployment parameters including transmitter power, receiver noise figure, antenna heights and down-tilt, and surrounding terrain, as well as climate conditions. For example, under normal operation, a GP duration of around 0.15 ms—offering protection from BS up to ~45 km distant—may be sufficient. Even so, the required GP can be different in different base stations in a (large) network. Nevertheless, based on (almost) worst case analysis, it can be possible to choose a single nominal GP that can be used in all RAN base stations to avoid a sufficiently high percentage of possible interference conditions.

However, climate conditions can make this more difficult. In certain regions of the world a ducting phenomenon can happen in the atmosphere during certain weather conditions. The appearance of the duct can depend on, e.g., temperature and humidity, and when the duct appears it can "channel" a radio signal such that it propagates a significantly longer distance than under normal conditions. More specifically, an atmospheric duct is a layer in which the refractivity of the lower atmosphere (e.g., the troposphere) rapidly decreases. In this way, atmospheric ducts can trap the propagating signals in the ducting layer, instead of radiating out in space. In other words, the ducting layer acts as a wave guide in which trapped signals can propagate beyond line-of-sight (LOS) distances with relatively low path loss, e.g., even lower than in LOS propagation.

As such, when ducting is present, the increased propagation distances of signals from interfering base stations can create a need for a significantly larger DL-UL GP to avoid DL-to-UL interference. For example, to avoid interference from a base station at a distance 300 km, a GP of ~1 ms is needed. Although temporary, the onset and duration of ducting is unpredictable; for example, a ducting event can last from a couple of minutes to several hours.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 2. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second- generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 2. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 2. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

FIG. 3A shows a high-level block diagram of an exemplary LTE architecture in terms of its constituent entities— UE, E-UTRAN, and EPC— and high-level functional division into the Access Stratum (AS) and the Non-Access Stratum (NAS). FIG. 3A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 3B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 3C shows a block diagram of an exemplary LTE radio interface protocol architecture from the perspective of the PHY. The interfaces between the various layers are provided by Service Access Points (SAPs), indicated by the ovals in FIG. 3C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 4A illustrates an exemplary radio frame structure ("type 2") used for LTE TDD operation, while FIG. 4B shows an exemplary resource grid of a downlink (DL) slot used within the TDD radio frame. As shown in FIG. 4A, the radio frame has a fixed duration of 10 ms and consists of 10 subframes, labeled 0 through 9, each subframe of 1-ms duration and comprising two 0.5-ms slots. As shown in FIG. 4B, each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 4B, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{vRB}$ corresponds to PRB $n_{PRB}=n_{VRB}$. On the other hand, distributed VRBs may be mapped to non-consecutive PRBs according to various rules, as described in 3GPP TS 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

Although not shown, the resource grid for an UL TDD slot has a similar structure as the exemplary DL slot resource grid shown in FIG. 4B. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the respective resource grids. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n (=1, 2, 3, or 4) OFDM symbols in each subframe, where n is known as the Control Format Indicator (CFI) which as carried by the PCFICH transmitted in the first symbol of the control region.

While LTE was primarily designed for user-to-user communications, 5G (also referred to as "NW") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC service requires a low latency and high reliability transmission but perhaps for moderate data rates. In addition, NR is targeted to support deployment in lower-frequency spectrum similar to LTE, and in very-high-frequency spectrum (referred to as "millimeter wave" or "mmw").

Similar to LTE, NR uses OFDM in the downlink. Each NR radio frame is 10 ms in duration and is composed of 10 subframes having equal durations of 1 ms each. Each subframe consists of one or more slots, and each slot consists of 14 time-domain symbols. In addition to transmission in a slot (such as for LTE, discussed above), a mini-slot transmission is also allowed to reduce latency. A mini-slot may consist of any number of 1 to 14 OFDM symbols comprising a slot. It should be noted that the concepts of slot and mini-slot are not specific to a service, such that a mini-slot may be used for eMBB, URLLC, or other services.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Resource blocks are numbered in the frequency domain, starting with 0 from one end of the system bandwidth. Each resource element corresponds to one OFDM subcarrier during one OFDM symbol interval. Various SCS values (referred to as numerologies) are supported in NR and are given by $\Delta f=(15 \times 2^\alpha)$ kHz where $\alpha \in (0,1,2,3,4)$. $\Delta f=15$ kHz is the basic (or reference) subcarrier spacing that is also used in LTE. The slot length is related to subcarrier spacing or numerology according to $1/2^\alpha$ ms. For example, there is one (1-ms) slot per subframe at $\Delta f=15$ kHz, two 0.5-ms slots per subframe at $\Delta f=30$ kHz, etc.

Similar to LTE, DL transmissions are dynamically scheduled, whereby in each slot the gNB transmits downlink control information (DCI) about which UE data is to be transmitted and the RBs in the current DL slot used to carry the data. For example, DCI formats 1_0 and 1_1 are used to convey DL grants for transmission on PDSCH Similar to LTE, DCI is typically transmitted in the first one or two OFDM symbols in each NR slot on the PDCCH, with data carried on the PDSCH. A UE first detects and decodes PDCCH and, if successful, then decodes the corresponding PDSCH based on the DCI received via the PDCCH.

UL data transmissions are dynamically scheduled on the PUSCH via DCI transmitted on the PDCCH. For example, DCI formats 0_0 and 0_1 are used to convey UL grants to the UE for transmission on PUSCH. In case of TDD operation, the DCI (transmitted in a DL slot) always provides a scheduling offset to PUSCH resources in a subsequent UL slot.

As noted above, in TDD operation, certain subframes (LTE) or slots (NR) can be designated for UL transmissions, and other subframes or slots can be designated for DL transmissions. The DL-to-UL switch occurs in particular subframes or slots, referred to as special subframes (LTE) or flexible slots (NR). Table 1 below (from 3GPP TS 36.211, Table 4.2-2) shows seven different UL-DL TDD configurations available for LTE. The size of the GP and/or the number of symbols for DwPTS (downlink transmission in a special subframe) and for UpPTS (uplink transmission in a special subframe) can also be configured from a set of possible selections, as defined in Table 4.2-1 of 3GPP TS 36.211.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

On the other hand, NR provides many different TDD UL-DL configurations. There are 10 to 320 slots per each 10-ms radio frame depending on subcarrier spacing or numerology a. The OFDM symbols in a particular slot can be classified as downlink ("D"), flexible ("X"), or uplink ("U"). A semi-static TDD UL-DL configuration can be configured via RRC using the IE TDD-UL-DL-ConfigCommon information element (IE). Alternatively, the TDD configuration can be dynamically indicated with a Slot Format Indicator (SFI) conveyed with DCI (e.g., Format 2_0). For both dynamic and semi-static TDD configurations, both the number of UL and DL slots and the GP (e.g., the number of UL and DL symbols in X slots) can be configured extremely flexibly within a TDD configuration periodicity.

Although NR provides significant flexibility in configuring TDD UL-DL arrangements according to various requirements, in various configurations, the presence of remote interference can negatively impact the ability of a gNB to receive transmissions from UEs in an UL slot immediately following a GP.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for receiving a physical uplink shared channel (PUSCH) in a cell of a time-division-duplexed (TDD) radio access network (RAN). The exemplary method and/or procedure can be performed by a network node (e.g., base station, eNB, gNB, etc., or component thereof) in communication with user equipment (e.g., UE, wireless device, IoT device, modem, etc. or component thereof).

The exemplary methods and/or procedures can include determining whether remote base station interference (RI) is present in uplink (UL) transmissions in the cell. In some embodiments, the presence of RI can be determined with respect to a plurality of sequential symbols immediately following a guard period (GP) between downlink (DL) and uplink (UL) transmissions in the cell. The presence of RI can be determined in various exemplary ways.

The exemplary method and/or procedure can also include, based on the determining result, configuring activation or deactivation of code block group (CBG) based retransmissions in the cell. The exemplary method and/or procedure can further include sending control messages to one or more UEs in the cell, for applying the configuration, and decoding subsequent PUSCH transmissions received from the one or more UEs based on the configuration.

Other exemplary embodiments include network nodes (e.g., radio base station(s), eNBs, gNB s, CU/DU, controllers, etc.) configured to perform operations corresponding to various ones of the exemplary methods and/or procedures described above. Other exemplary embodiments include non-transitory, computer-readable media storing program instructions that, when executed by at least one processor, configure such network nodes to perform operations corresponding to the exemplary methods and/or procedures described herein.

These and other objects, features and advantages of the exemplary embodiments of the present disclosure will become apparent upon reading the following detailed description of the exemplary embodiments of the present disclosure.

DETAILED DESCRIPTION

As briefly mentioned above, although NR provides significant flexibility in configuring TDD UL-DL arrangements according to various requirements, in various configurations, the presence of remote interference can negatively impact the ability of a gNB to receive transmissions from UEs in an UL slot immediately following a GP. This is discussed in more detail below.

Figure 6:
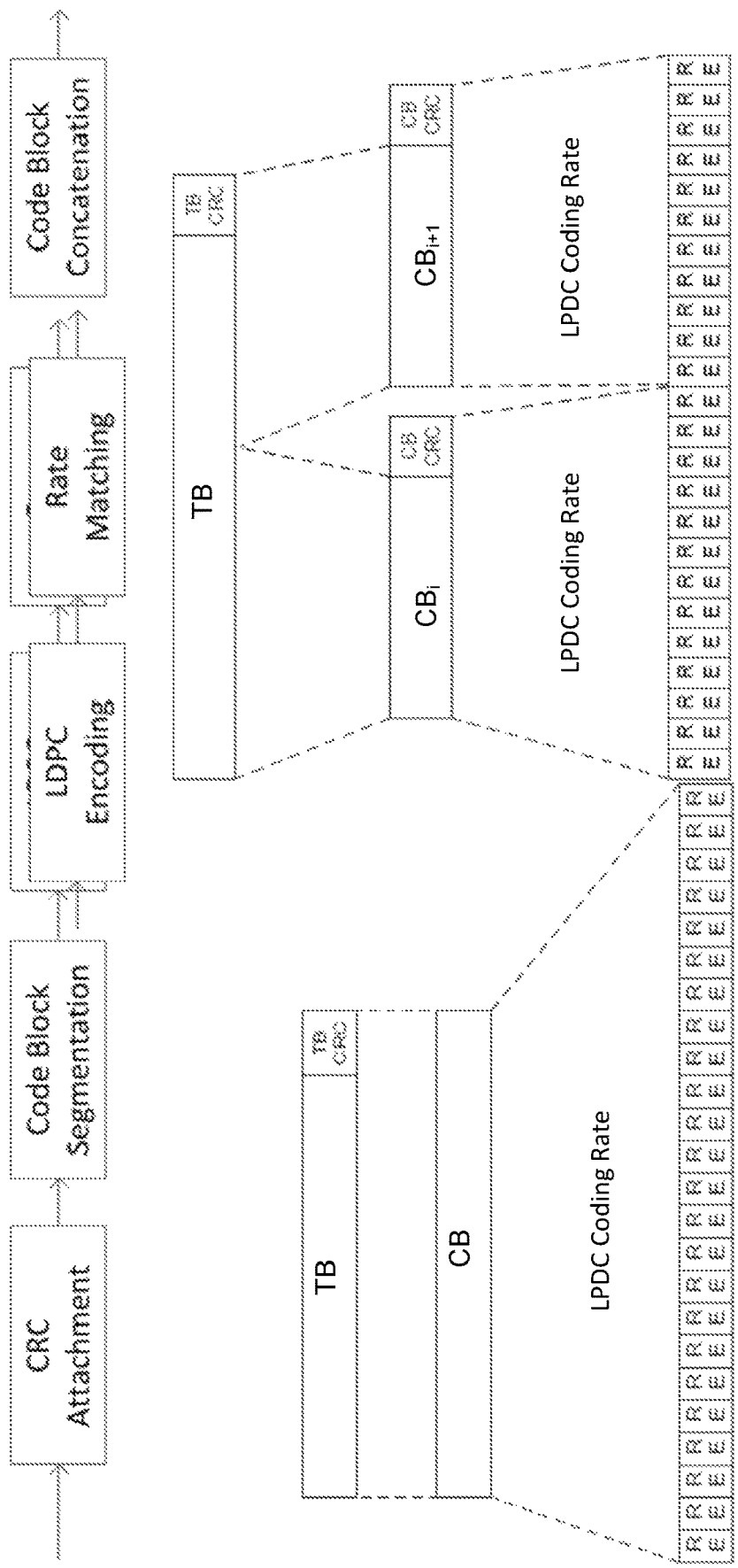
FIG. 6 shows an exemplary UE transmitter process for mapping an NR MAC-layer transport block (TB) onto PHY-layer resource elements (REs) used to transmit the information on a physical uplink shared channel (PUSCH).

FIG. 6 shows an exemplary UE transmitter process for mapping an NR MAC-layer transport block (TB) onto PHY-layer resource elements (REs) used to transmit the information on a physical uplink shared channel (PUSCH). First, cyclic redundancy check (CRC) information is attached to each TB to facilitate detection of errors in the received block. If the TB is less than a threshold, the TB (including CRC) is mapped to a single CB; otherwise, the TB is segmented into multiple code blocks (e.g., $CB_i$, $CB_{i+1}$ in FIG. 6). In this case, another CRC is attached to each CB to facilitate error detection on a per-CB level. Multiple CBs can be grouped together to form a Code Block Group (CBG), and if CBG-based retransmission is configured, the gNB can schedule retransmission (by the UE) of the CBGs independently, so that instead of the entire TB, only incorrectly decoded CBGs are retransmitted.

Figure 1:
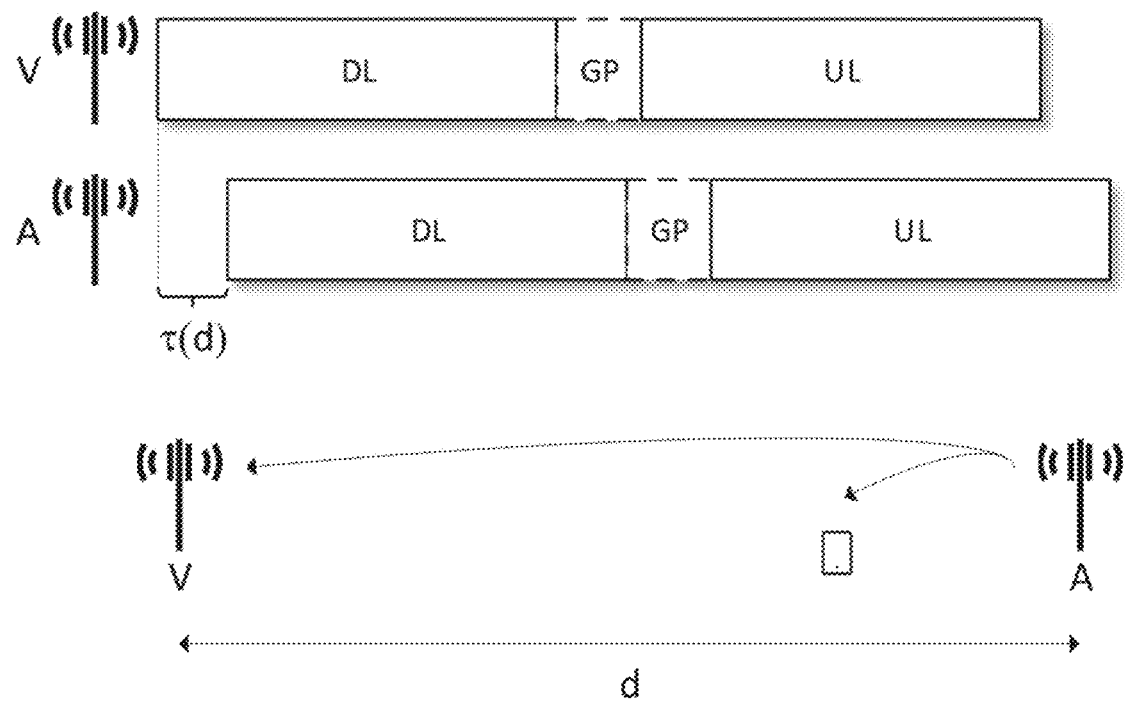
FIG. 1 is a high-level diagram illustrating the effect of GP selection on mitigating and/or avoiding UL-DL interference between base stations.
Figure 2:
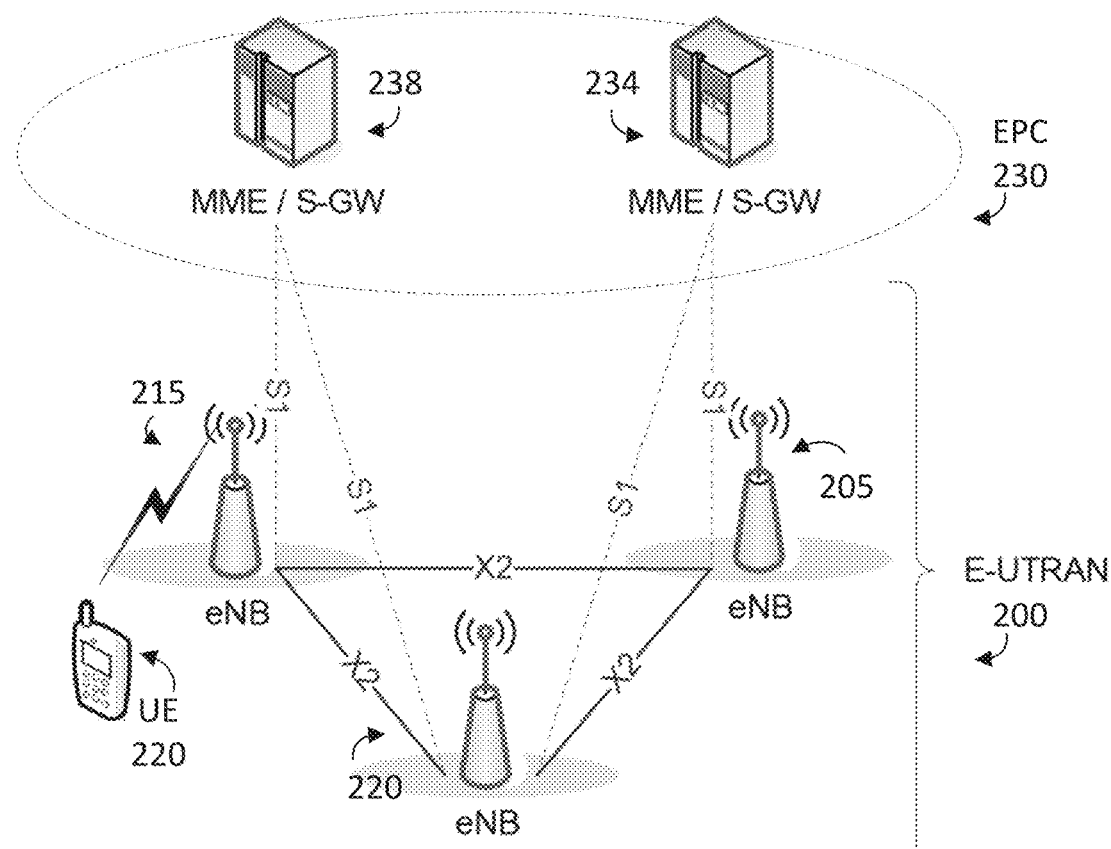
FIG. 2 is a high-level block diagram of an exemplary architecture of the Long-Term Evolution (LTE) Evolved UTRAN (E-UTRAN) and Evolved Packet Core (EPC) network, as standardized by 3GPP.
Figure 3A:
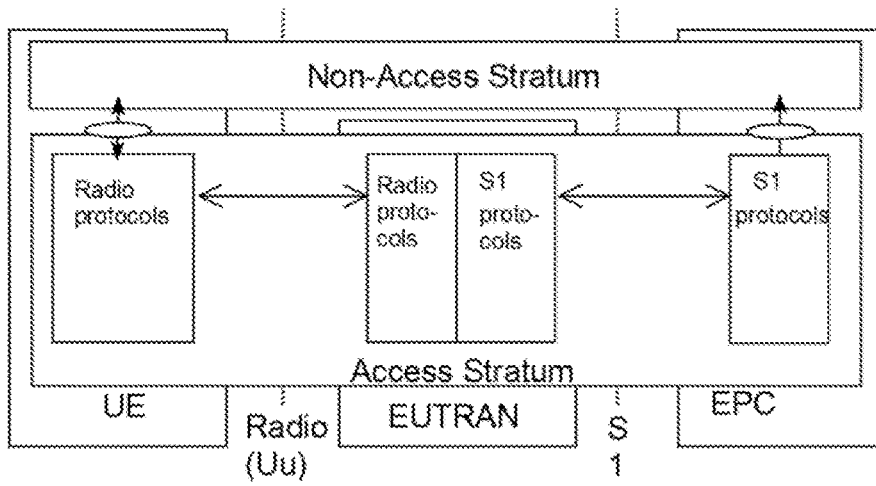
FIG. 3A is a high-level block diagram of an exemplary E-UTRAN architecture in terms of its constituent components, protocols, and interfaces.
Figure 3B:
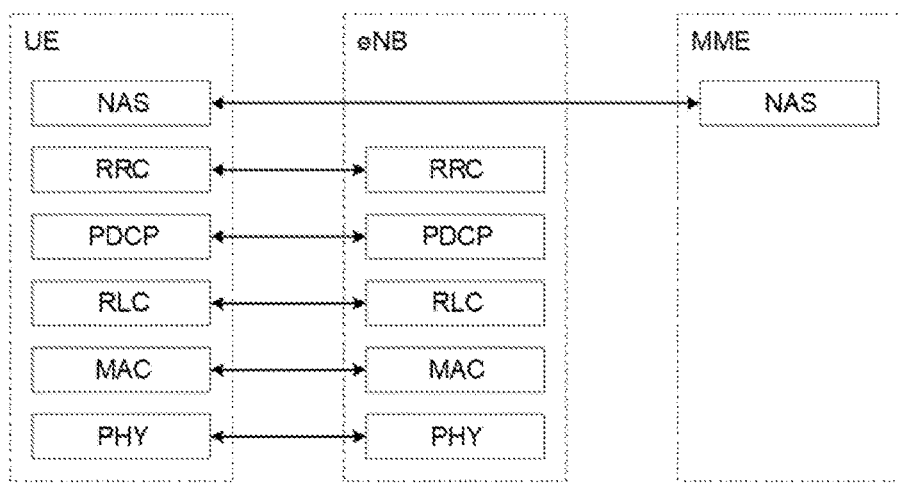
FIG. 3B is a block diagram of exemplary protocol layers of the control-plane portion of the radio (Uu) interface between a user equipment (UE) and the E-UTRAN.
Figure 3C:
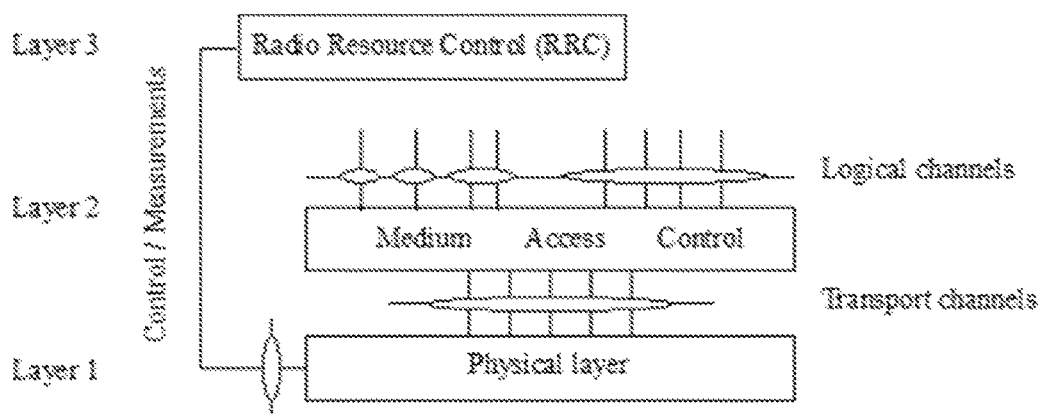
FIG. 3C is a block diagram of an exemplary LTE radio interface protocol architecture from the perspective of the PHY layer.
Figure 4A:
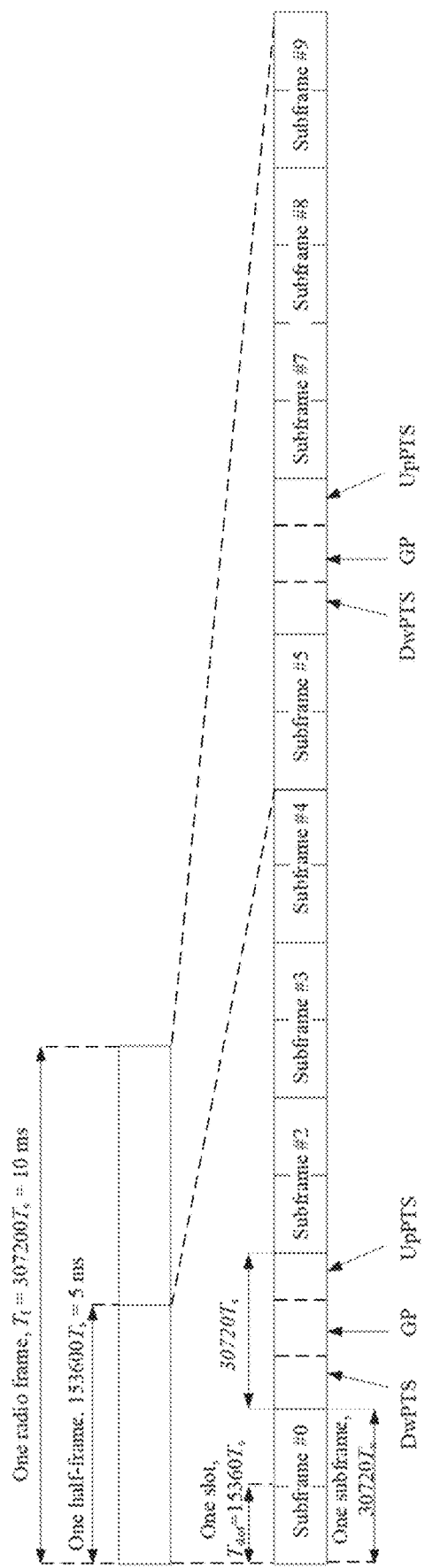
FIGS. 4A and 4B illustrate an exemplary radio frame and an exemplary downlink slot resource grid, respectively, associated with LTE time-division duplexing (TDD) operation.
Figure 4B:
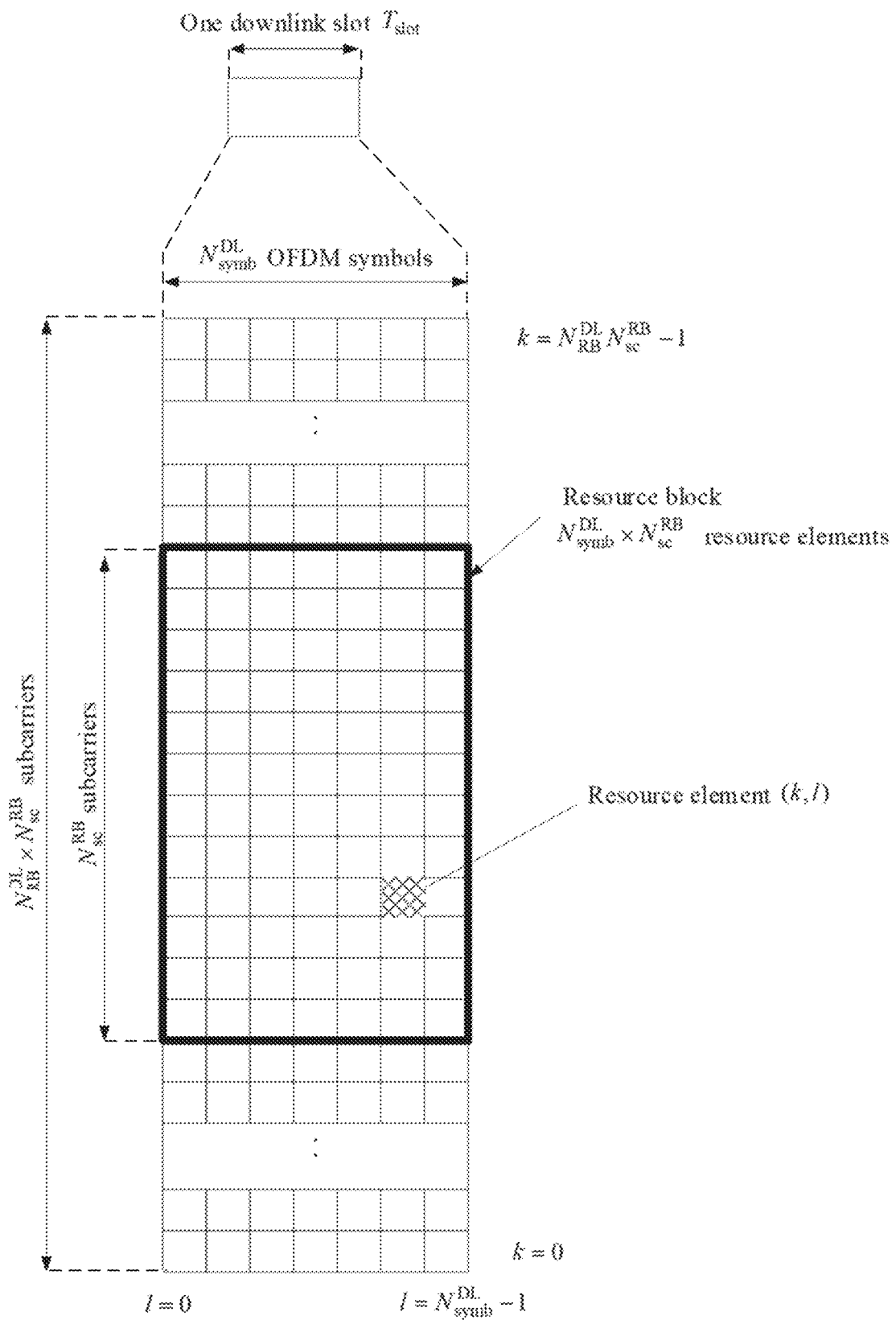
Figure 5:
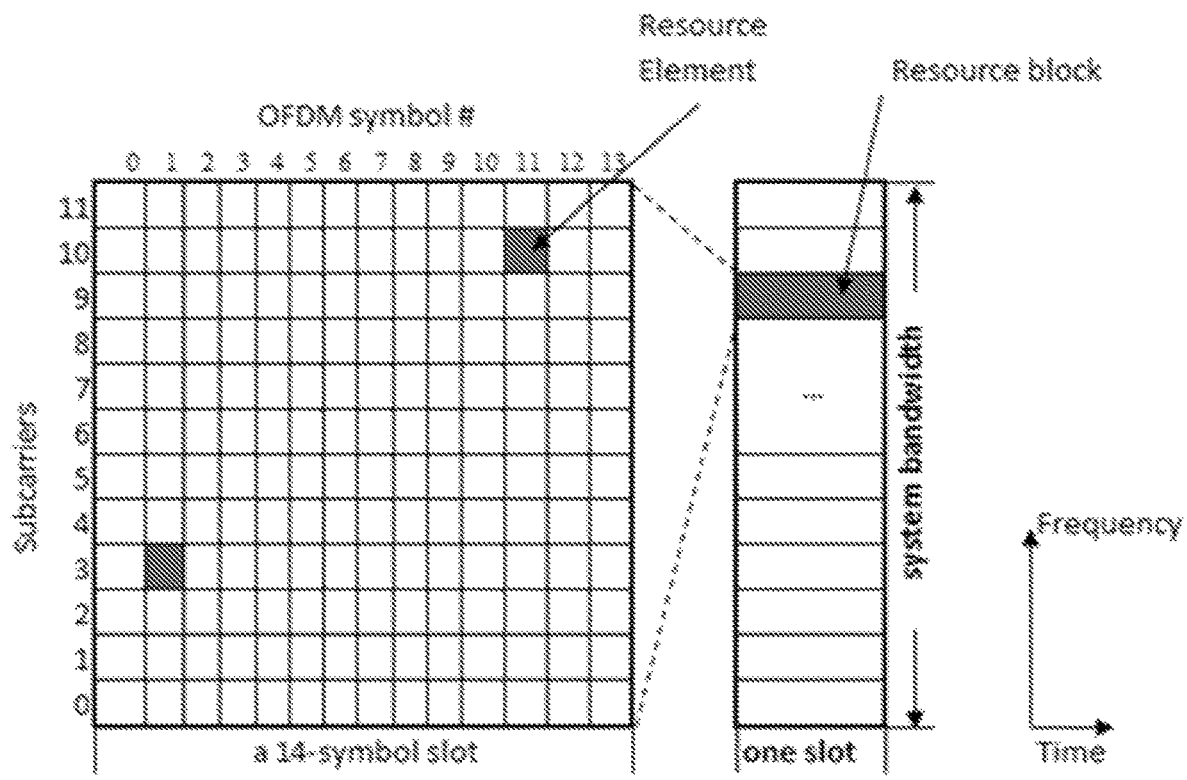
FIG. 5 shows an exemplary time-frequency resource grid for an NR slot.
Figure 7:
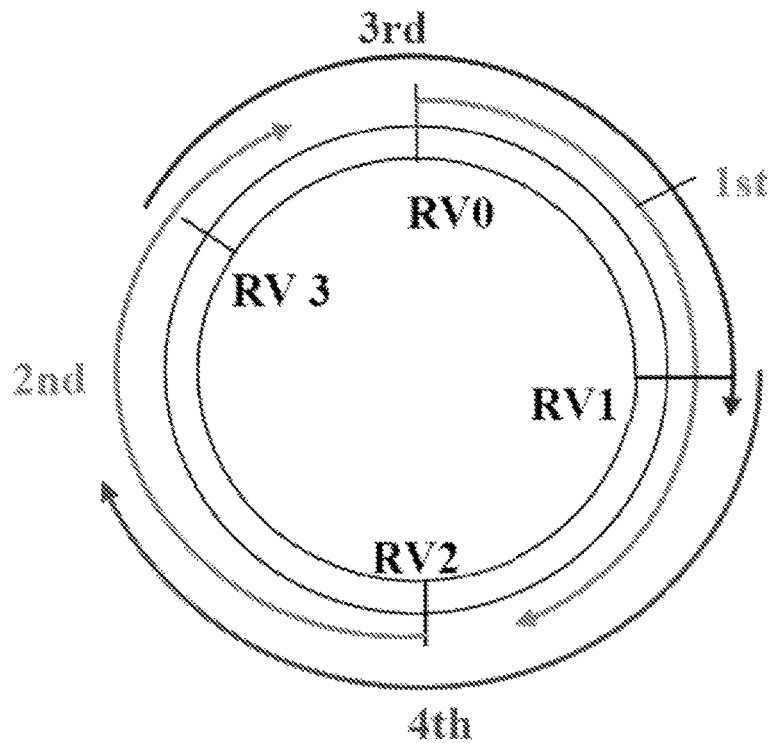
FIG. 7 illustrates an exemplary circular buffer arrangement for transmission and retransmission of coded output bits, according to various exemplary embodiments of the present disclosure.

Each CB undergoes a separate low-density parity check (LDPC) encoding procedure, which maps the information bits in the CB to coded output bits. For each CB, the coded output bits are placed in a circular buffer, where bit-level interleaving is also applied. FIG. 7 illustrates an exemplary circular buffer arrangement for transmission and retransmission of coded output bits, according to various exemplary embodiments of the present disclosure.

Next, for each CB, rate-matching is applied to read out the number of coded bits from the circular buffer that are needed to fit the resources allocated to the PUSCH transmission. Bits are read out of the buffer starting at a certain starting point corresponding to a particular redundancy version (RV). As shown in FIG. 7, each of RVs 0-3 corresponds to different starting position in the circular buffer. Different RVs can be transmitted in initial transmissions and retransmissions, according to an incremental redundancy (IR) HARQ technique. After per-CB rate matching, the rate-matched output bits from the respective CBs are concatenated and finally mapped to REs allocated for the PUSCH.

In addition to the resource allocation, DCI format 0_1 used for scheduling PUSCH transmission includes various other contents that are summarized below:
  Frequency domain resource assignment—number of bits determined by the following, where $N_{RB}^{UL,BWP}$ is the size of the active UL bandwidth part;
  Time domain resource assignment—1-4 bits as defined in Subclause 6.1.2.1 of [6, TS38.214]. The size of this field is determined as $\lceil \log_2 (I) \rceil$ bits, where I the number of entries in the higher layer parameter pusch-AllocationList;
  Modulation and coding scheme (MCS)—5 bits (defined in 3GPP TS 38.214 section 6.1.4.1);
  New data indicator (NDI)—1 bit;
  Redundancy version (RV)—2 bits;
  HARQ process number—4 bits;
  $1^{st}$ downlink assignment index—1 or 2 bits;
  1 bit for semi-static HARQ-ACK codebook;
  2 bits for dynamic HARQ-ACK codebook;
  CBG transmission information (CBGTI)—0, 2, 4, 6, or 8 bits as determined by RRC parameter maxCodeBlockGroupsPerTransportBlock for PUSCH.

Each CW is mapped to a TB. Based on the target code rate and the PUSCH allocation, the UE derives the TB size (TBS) by calculating the number of available REs for PUSCH assuming a fixed default overhead. As such, the TBS determination does not depend on the actual RE overhead in the scheduled slot.

When receiving a PUSCH transmission on allocated resources, the gNB maps the received modulation symbols to soft estimates of the coded bits and stores them in a soft buffer. It then feeds the soft estimates of the coded bits to the LDPC decoder and tries to decode the CB. If all CBs in a TB (or in a CBG) are correctly decoded, the TB (or CBG) is considered correctly decoded. Otherwise, the gNB will perform a retransmission of the TB (or CBG). The gNB will maintain its soft buffer until the TB has been correctly decoded after a number of retransmissions by the UE.

For retransmission of a TB or CBG, the gNB typically schedules an RV that was not previously transmitted. For example, RV0 can be transmitted in the initial transmission and RV2 can be transmitted in the first retransmission. The gNB's soft buffer typically contains room for the entire circular buffer. The gNB will add the estimated soft channel bits corresponding to the retransmission in the correct position in the soft buffer (i.e., the position associated with the RV being used). In case soft estimates of some bits are available from a previous (re)transmission, the different soft estimates of the same bits are combined.

After the coded bits are mapped to modulation symbols, the NR transmitter maps the modulation symbols to REs of the allocated resource based on a particular sequential order. More specifically, the modulation symbols are first mapped to different layers, then to different subcarriers in an OFDM symbol, and lastly to different OFDM symbols. This means that the information bits from the TB are time-ordered in the actual transmission, i.e., a particular information bit will be mapped to either the same or a later OFDM symbol than a preceding information bit in the TB. Since the CBs within a TB are also sequentially mapped in the same manner, this implies that the CBs are also time-ordered in the actual transmission.

Figure 8:
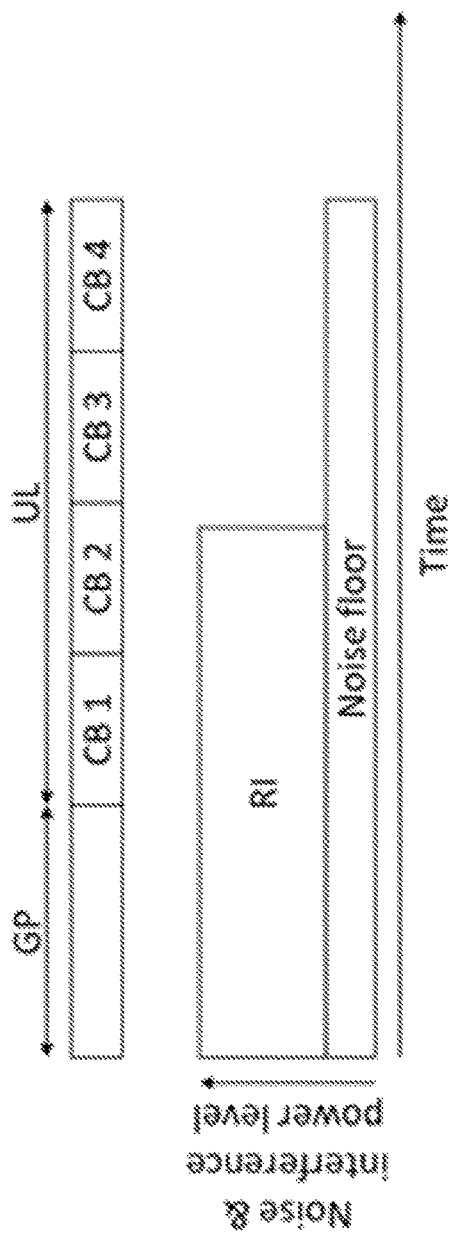
FIG. 8 shows an exemplary scenario in which remote interference (RI) affects the decoding of code blocks (CB) 1-2 of a transport block (TB) transmitted on PUSCH but not CBs 3-4 of the same TB, according to various exemplary embodiments of the present disclosure.
Figure 9:
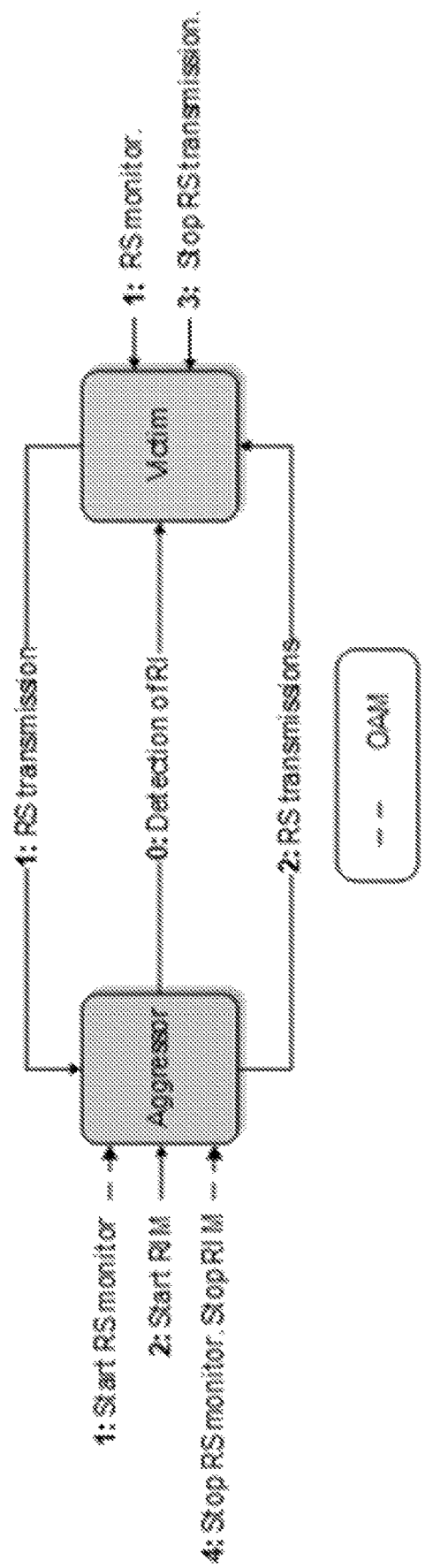
FIG. 9 shows a state transition diagram for an exemplary RI management technique, according to various exemplary embodiments of the present disclosure.

Remote interference (or RI, for short) may affect the received signal following the DL to UL switch, which in turn may lead to incorrectly decoded transmissions. Due to the time-ordered mapping property discussed above, however, only the CB(s) mapped to REs in the first OFDM symbols after a DL/UL switch can be significantly affected by RI, while other CB s mapped to later OFDM symbols remain relatively unaffected. As such, the successful decoding probability can vary greatly across CBs in the same TB when RI is present. FIG. 8 shows an exemplary arrangement where RI affects the decoding of CB1-2 but not CB3-4, where CB1-4 are time-ordered in the PUSCH transmission.

When RI is not present, the different CBs may experience similar successful decoding probabilities, and hence, if the TB is incorrectly decoded, it is likely that this is due to a link adaptation error. For example, the MCS may have been set too aggressively due to an incorrect estimate of interference level in the slot and/or the CSI (e.g., based on UL sounding) was outdated. Since the same MCS is used for all CBs, it is likely that all CBs where incorrectly decoded, although it is possible that only some of the CBs where unsuccessfully decoded due to varying channel conditions. In this case, it may not be beneficial to utilize CBG-based retransmissions, since the UEs served by the gNB must be configured to search for a larger UL DCI that includes a CBGTI field. In other words, the DCI payload is increased, which either reduces the effective code rate of the DCI, leading to poorer detection performance, or requires selecting a larger PDCCH aggregation level with more overhead, thereby decreasing the overall capacity of PDCCH.

As mentioned above, to mitigate DL-to-UL interference occurring due to ducting events in TDD macro deployments, an aggressor base station (e.g., gNB) can increase its GP and thereby reduce the number of DL symbols that it transmits. Although this reduces DL capacity in the aggressor cell, it also reduces the UL interference level in the victim cell and therefore be beneficial to the network performance as a whole. Even so, due to the loss in DL capacity, it is crucial to apply the mechanism only when the remote aggressor base station is actually causing interference to the victim, e.g., during a tropospheric ducting event. Thus, an aggressor base station must be made aware that it is causing RI to a victim base station in order to know when to increase the GP and thereby mitigate this RI.

FIG. 8 shows a state transition diagram for an exemplary RI management technique, according to various exemplary embodiments of the present disclosure. In the technique shown in FIG. 8, the RI victim base station transmits a reference signal (e.g., RI management reference signal, or RIM-RS) in certain time locations in order to make aggressor base station(s) aware that they are interfering with the victim. RIM-RS are typically transmitted at the end of a TDD DL period (e.g., immediately before the GP). Since the TDD UL and DL propagation channels are reciprocal, the aggressor would receive the RIM-RS at the same signal strength as the victim receives the aggressor's interfering signal, assuming that the same transmit power and transmit/receive antenna patterns are used for both transmissions (or that differences can be determined and accounted for). A potential aggressor base station can monitor certain time locations (e.g., beginning of the UL region immediately following a GP) for RIM-RS sequences transmitted by potential victim base stations. Upon detecting a RIM-RS sequence, the aggressor base station can infer that it is causing remote interference to a certain victim base station. In response, the aggressor base station can apply an RI mitigation mechanism.

Accordingly, exemplary embodiments of the present disclosure provide novel techniques to flexibly activate and deactivate CBG-based retransmission based on RI impact on PUSCH. For example, when RI affecting PUSCH is detected, CBG-based retransmission can be activated for affected CBs (e.g., CBs following DL to UL switch). Since only CBGs affected by RI (e.g., CBGs mapped to resources earlier in time) will require retransmission, this can reduce the amount of retransmitted data as compared to retransmitting an entire TB (e.g., which also can include unaffected CBGs). Reducing the amount of retransmitted data increases system capacity for initial data transmissions and, consequently, system data throughput.

Furthermore, when the RI affecting PUSCH is no longer detected, such that the CBs following the DL to UL switch are no longer affected by RI, the CBG-based retransmission of the TBs including these CBs can be deactivated. Because of the reduced size of DCI used to allocate resources for non-CBG (re)transmissions, this selective deactivation reduces required PDCCH overhead and thereby increases PDCCH capacity.

In some exemplary embodiments, RI can be detected based on which CB(s) or CBG(s) require retransmission due to decoding error together with a known time-ordered mapping of CBs or CBGs to the REs allocated for PUSCH transmission. As illustrated in FIG. 8, RI will mainly affect CB(s) or CBG(s) mapped to REs in one or more time-domain symbols immediately after the DL to UL switch. As such, the presence of RI can be detected based on unsuccessful decoding of the initial transmissions of these CB s/CBGs. For example, this could be detected by some number of consecutive unsuccessful decoding attempts, some fraction of consecutive decoding attempts being unsuccessful (e.g., two out of three), or an average decoding error rate exceeding some threshold. When such decoding errors of initial transmissions are detected, the network node can activate CBG-based retransmissions (and possibly other RI mitigation techniques) to eliminate, minimize, and/or reduce the impact of the RI.

In some embodiments, such decoding error metrics can be calculated and/or determined on a per-CB basis, such that a distribution of a particular decoding error metric across the time-ordered CBs of the PUSCH transmissions following the GP can be determined. For example, with reference to FIG. 8, decoding error metrics can be determined for each of UL CBs 1-4 following the GP. In this particular example, the decoding error metrics for CBs 1-2 would be noticeably larger than the corresponding decoding error metrics for CBs 3-4.

In such embodiments, detection of the presence of RI following the GP can be based on a difference between decoding error metrics for sequential CBs exceeding a threshold. For example, the presence of RI in CBs 1-2 can be detected if the difference between decoding error metrics for CBs 1-2 and decoding error metrics for CBs 3-4 is greater than the threshold. Otherwise, if the differences between decoding error metrics for sequential CBs is below the threshold, RI is assumed to be absent. In some embodiments, the difference threshold can be set to distinguish between RI and other impairments (e.g., local interference) and/or transmission settings (e.g., MCS) that can increase decoding error metrics for all CBs. For example, although the absolute decoding error metrics of CBs 1-4 could be relatively large, the differences between decoding error metrics of sequential CB s can be relatively small, indicating that RI is not present.

In other embodiments, the presence of RI can be detected based on respective UL signal metrics associated with time-domain resources following the GP. Such signal metrics can include received signal strength indicator (RSSI), reference signal received power (RSRP), reference signal received quality (RSRQ), interference estimate, signal-to-interference-plus-noise ratio (SINR), etc. In some embodiments, such signal metrics can be calculated and/or determined on a per-CB basis, such that a distribution of a particular signal metric across the time-ordered CBs of the PUSCH transmissions following the GP can be determined. In some embodiments, such signal metrics can be determined on a per-symbol basis within the UL slot following the GP. Similar to the other embodiments discussed above, detection of the presence of RI following the GP can be based on a difference between signal metrics for sequential CBs or sequential symbols exceeding a threshold. Similar to the other embodiments, the difference threshold can be set to distinguish between RI and other impairments (e.g., local interference) and/or transmission settings (e.g., MCS) that can increase decoding error metrics for all CBs. For example, although the signal metrics for the respective symbols could indicate relatively poor conditions likely to result in a relatively high CB decoding error rate, the differences between signal metrics of sequential time-domain resources could be relatively small, indicating that RI is not present.

Note that by determining the distribution of signal metrics or decoding error metrics across sequential CBs and/or sequential time-domain resources associated with CBs, exemplary embodiments can determine how many CBs following the GP are affected by RI and can adaptively activate CBG-based retransmissions for those CBs. Furthermore, exemplary embodiments can refrain from activating CBG-based retransmissions for the CBs later in time that are determined not to be affected by RI. Using the example shown in FIG. 8, CBG-based retransmission can be activated for CBs 1-2 but not for CBs 3-4 upon detecting RI. Since those later CBs are less likely to require retransmission due to decoding error caused by RI, retransmission of a full TB or CB can be performed without significantly impacting PUCCH performance and/or capacity.

Figure 10:
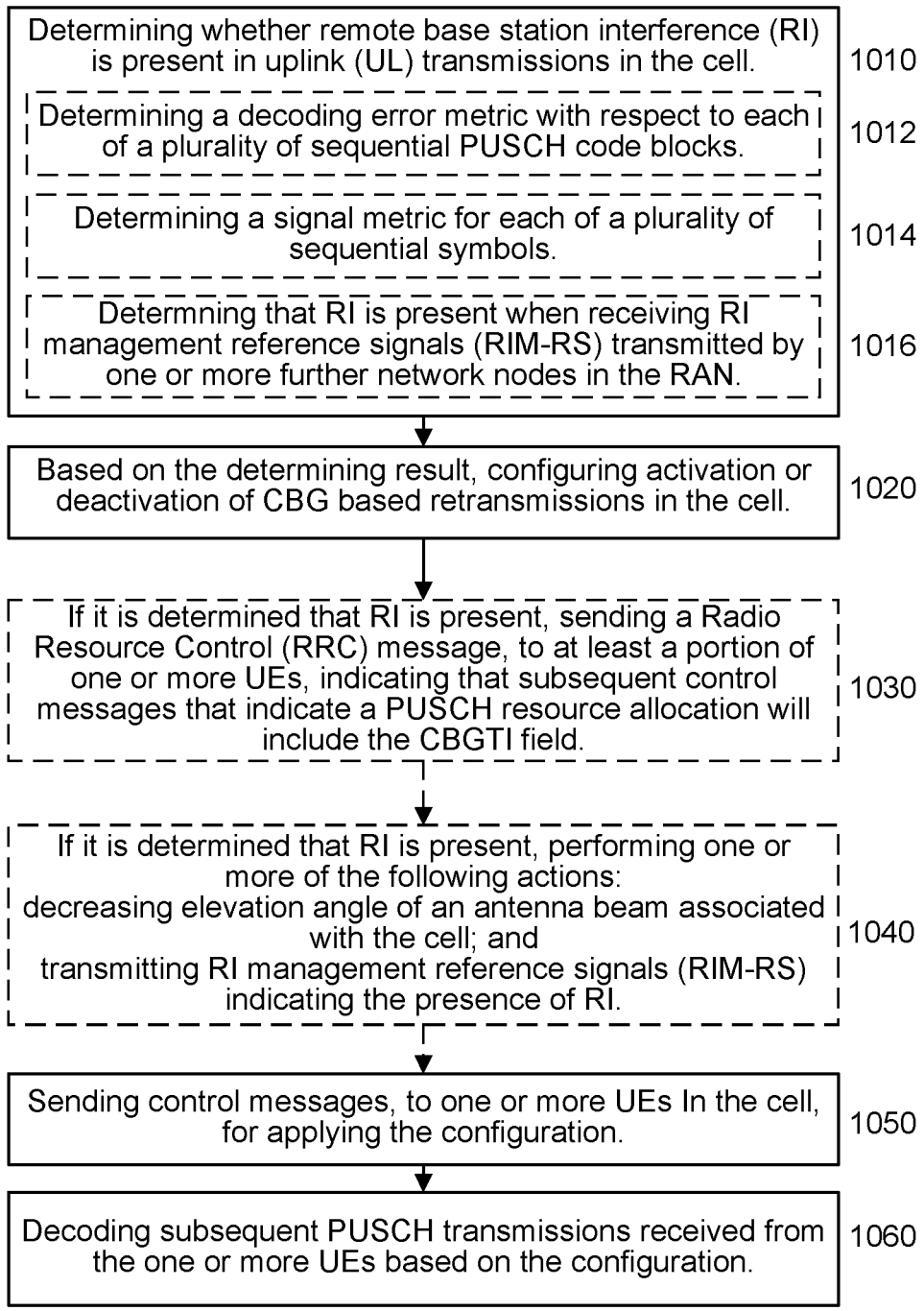
FIG. 10 shows a flow diagram of an exemplary method and/or procedure for receiving a PUSCH in a cell of a time-division-duplexed (TDD) radio access network (RAN), according to one or more exemplary embodiments of the present disclosure.

FIG. 10 shows a flow diagram of an exemplary method and/or procedure for receiving a physical uplink shared channel (PUSCH) in a cell of a time-division-duplexed (TDD) radio access network (RAN). The exemplary method and/or procedure can be performed by a network node (e.g., base station, eNB, gNB, etc., or component thereof) in communication with user equipment (e.g., UE, wireless device, IoT device, modem, etc. or component thereof). For example, the exemplary method and/or procedure shown in FIG. 10 can be implemented in a network node configured according to FIG. 11. Although FIG. 10 shows blocks in a particular order, this order is merely exemplary, and the operations of the exemplary method and/or procedure can be performed in a different order than shown in FIG. 10 and can be combined and/or divided into blocks having different functionality. Optional blocks or operations are shown by dashed lines.

Exemplary embodiments of the method and/or procedure illustrated in FIG. 10 can include the operations of block 1010, where the network node can determine whether remote base station interference (RI) is present in uplink (UL) transmissions in the cell. In some embodiments, the presence of RI can be determined with respect to a plurality of sequential symbols immediately following a guard period (GP) between downlink (DL) and uplink (UL) transmissions in the cell.

In some embodiments, determining whether remote base station interference (RI) is present can include the operations of sub-block 1012, where the network node can determine a decoding error metric with respect to each of a plurality of sequential PUSCH code blocks, where each PUSCH code block is carried by one or more of the sequential symbols. In some embodiments, determining whether remote base station interference (RI) is present can include the operations of sub-block 1014, where the network node can determine a signal metric for each of the sequential symbols. Exemplary signal metrics can include received signal strength indicator (RSSI), reference signal received power (RSRP), reference signal received quality (RSRQ), interference estimate, signal-to-interference-plus-noise ratio (SINR), etc. In some embodiments, determining whether remote base station interference (RI) is present can include the operations of sub-block 1016, where the network node determines that RI is present when receiving RI management reference signals (RIM-RS) transmitted by one or more further network nodes in the RAN.

The exemplary method and/or procedure can also include operations of block 1020, where the network node can, based on result of block 1010, configure activation or deactivation of code block group (CBG) based retransmissions in the cell.

In some embodiments, if it is determined in block 1010 that RI is present, the exemplary method and/or procedure can also include the operations of block 1030, where the network node can send a Radio Resource Control (RRC) message, to at least a portion of the one or more UEs, indicating that subsequent control messages (e.g., DCIs) that indicate a PUSCH resource allocation will also include a CBG transmission information (CBGTI) field.

In some embodiments, if it is determined in block 1010 that RI is present, the exemplary method and/or procedure can also include the operations of block 1040, where the network node can perform one or more of the following actions: decrease an elevation angle of an antenna beam associated with the cell; and transmitting RI management reference signals (RIM-RS) indicating the presence of RI. For example, decreasing the antenna beam elevation angle (e.g., towards ground level) can be used to reduce the amount of RI received by the network node. Similarly, transmitting RIM-RS can be used to indicate to a receiving network node that it is an aggressor node, such that the aggressor node can take subsequent actions to mitigate the RI, as discussed in more detail above.

The exemplary method and/or procedure can also include operations of block 1050, where the network node can send control messages, to one or more user equipment (UEs) in the cell, for applying the configuration. In some embodiments, each control message can comprise a downlink control information (DCI) message sent on a physical downlink control channel (PDCCH). In some embodiments, each DCI can include a CBG transmission information (CBGTI) field if CBG based retransmission activation is configured.

In some embodiments, the exemplary method and/or procedure can also include operations of block 1060, where the network node can decode subsequent PUSCH transmissions from the one or more UEs based on the configuration. For example, if CBG based retransmission activation is configured, the network node can decode PUSCH retransmissions knowing that CBG based retransmission is activated.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
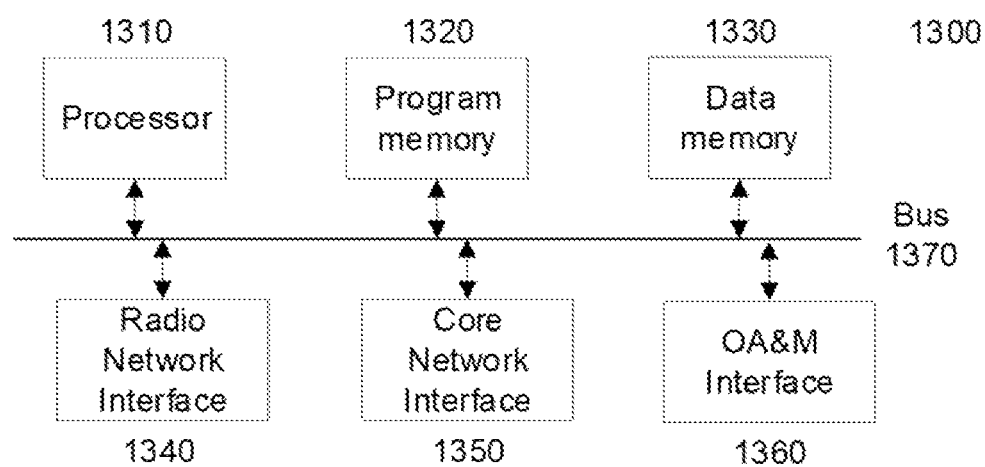
FIG. 11 is a block diagram of an exemplary network node according to one or more exemplary embodiments of the present disclosure.

FIG. 11 shows a block diagram of an exemplary network node 1300 according to various embodiments of the present disclosure. For example, exemplary network node 1300 can be configured by execution of instructions, stored on a computer-readable medium, to perform operations corresponding to one or more of the exemplary methods and/or procedures described above. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 comprises processor 1310 which is operably connected to program memory 1320 and data memory 1330 via bus 1370, which can comprise parallel address and data buses, serial ports, or other methods and/or structures known to those of ordinary skill in the art.

Program memory 1320 comprises software code (e.g., program instructions) executed by processor 1310 that can configure and/or facilitate network node 1300 to communicate with one or more other devices using protocols according to various embodiments of the present disclosure, including one or more exemplary methods and/or procedures discussed above. Program memory 1320 can also comprise software code executed by processor 1310 that can facilitate and specifically configure network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1340 and core network interface 1350. By way of example and without limitation, core network interface 1350 can comprise the S1 interface and radio network interface 1350 can comprise the Uu interface, as standardized by 3GPP. Program memory 1320 can further comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can comprise multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill in the art will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more SGWs, MMEs, SGSNs, GGSNs, and other physical devices that comprise functionality found in GERAN, UTRAN, EPC, SGC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

As described herein, a "network node" is also referred to as a "base station." However, a "network node" can correspond to any type of node, in a network, that can communicate with a UE and/or with another network node. Other examples of network nodes include multi-standard radio (MSR) radio node (such as MSR BS), eNodeB (or eNB), gNodeB (or gNB), MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), etc.

Also, the term "radio access technology" (or "RAT") can refer to any RAT including UTRA, E-UTRA, narrow band internet of things (NB-IoT), WiFi, Bluetooth, next generation RAT (NR), 4G, 5G, etc. Furthermore, network nodes can be capable of supporting a single RAT or multiple RATs, depending on the particular embodiment.

Also, the term "signal" as used herein can refer to any physical signal or physical channel. Examples of DL physical signals include reference signal (RS) such as PSS, SSS, CRS, PRS, CSI-RS, DMRS, NRS, NPSS, NSSS, SS, MBSFN RS, etc. Examples of UL physical signals include reference signal such as SRS, DMRS, etc. The term "physical channel" (e.g., in the context of channel reception) is used herein interchangeably with the term "channel." For example, a physical channel can carry higher layer information (e.g., RRC, logical control channel, etc.).

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

1. A method for receiving a physical uplink shared channel (PUSCH) in a cell of a time-division-duplexed (TDD) radio access network (RAN), the method comprising:
    determining whether remote base station interference (RI) is present in uplink (UL) transmissions in the cell;
    based on the determining result, selecting one of the following for subsequent PUSCH transmissions comprising a plurality of sequential symbols:
        a first configuration including: a first arrangement applicable to an initial portion of the sequential symbols, and a second arrangement applicable to a subsequent portion of the sequential symbols; and
        a second configuration applicable to all of the sequential symbols;
    sending control messages, to one or more user equipment (UEs), indicating the selected configuration; and
    decoding subsequent PUSCH transmissions from the one or more UEs based on the selected configuration.
2. The method of embodiment 1, wherein the plurality of sequential symbols immediately follows a guard period (GP) between downlink (DL) and uplink (UL) transmissions in the cell.
3. The method of embodiment 2, wherein the presence of RI is determined with respect to the plurality of sequential symbols immediately following the GP.
4. The method of any of embodiments 1-3, wherein the second configuration comprises either the first arrangement or the second arrangement.
5. The method of any of embodiments 1-4, wherein the first arrangement comprises retransmission using code block groups (CBGs), and the second arrangement comprises retransmission without using CBGs.
6. The method of embodiment 5, wherein the first arrangement further comprises no PUSCH transmissions during at least part of the initial portion.
7. The method of embodiment 6, wherein:
    the initial portion includes a first slot comprising a plurality of symbols; and
    the first arrangement further comprises:
        dividing the first slot into a plurality of mini-slots; and
        no PUSCH transmissions during one or more initial mini-slots of the plurality of mini-slots.
8. The method of any of embodiments 1-7, wherein:
    determining whether RI is present comprises determining a decoding error metric with respect to each of a plurality of sequential PUSCH code blocks; and each PUSCH code block is carried by one or more of the sequential symbols.
9. The method of embodiment 8, wherein the first configuration is selected if a difference between the decoding error metrics associated with the PUSCH code blocks carried by the initial portion and the decoding error metrics associated with the PUSCH code blocks carried by subsequent portion is greater than or equal to a threshold.
10. The method of any of embodiments 8-9, wherein the second configuration is selected if the difference is less than the threshold.
11. The method of any of embodiments 1-7, wherein determining whether RI is present comprises determining a signal metric for each of the sequential symbols.
12. The method of embodiment 11, wherein the first configuration is selected if a difference between the signal metrics associated with the initial portion and the signal metrics associated with the subsequent portion is greater than or equal to a threshold.
13. The method of any of embodiments 11-12, wherein the second configuration is selected if the difference is less than the threshold.
14. The method of any of embodiments 1-7, wherein determining whether RI is present comprises receiving RI management reference signals (RIM-RS) transmitted by one or more further network nodes in the RAN.
15. The method of embodiment 14, wherein the first configuration is selected if the RIM-RS are associated with the initial portion but not the subsequent portion.
16. The method of any of embodiments 1-15, further comprising, if it is determined that RI is present, performing one or more of the following actions:
decreasing elevation angle of an antenna beam associated with the cell; and
transmitting RI management reference signals (RIM-RS) indicating the presence of RI.
17. The method of any of embodiments 1-16, wherein each control message further indicates a PUSCH resource allocation in the initial portion or the subsequent portion.
18. The method of embodiment 17, wherein if the first configuration is selected:
the control messages that indicate a PUSCH resource allocation in the initial portion further indicate the first arrangement; and
the control messages that indicate a PUSCH resource allocation in the subsequent portion further indicate the second arrangement.
19. The method of any of embodiments 17-18, wherein each control message comprises a downlink control indicators (DCI) sent on a physical downlink control channel (PDCCH).
20. The method of embodiment 19, wherein each DCI comprises a CBG transmission information (CBGTI) field only if the first configuration is selected.
21. The method of embodiment 17-20, further comprising, if it is determined that RI is present, sending a Radio Resource Control (RRC) message, to at least a portion of the one or more UEs, indicating that subsequent DCIs that indicate a PUSCH resource allocation will include the CBGTI field.
22. A method for transmitting on a physical uplink shared channel (PUSCH) in a cell of a time-division-duplexed (TDD) radio access network (RAN), the method comprising:
receiving a control message comprising:
a PUSCH resource allocation within a plurality of sequential symbols comprising an initial portion and a subsequent portion; and
a PUSCH configuration comprising one of the following:
a first arrangement if the PUSCH resource allocation is within the initial portion; and
a second arrangement if the PUSCH resource allocation is within the subsequent portion;
subsequently transmitting on the PUSCH using the PUSCH resource allocation and the PUSCH configuration.
23. The method of embodiment 22, wherein the plurality of sequential symbols immediately follows a guard period (GP) between downlink (DL) and uplink (UL) transmissions in the cell.
24. The method of any of embodiments 22-23, wherein the first arrangement comprises retransmission using code block groups (CBGs), and the second arrangement comprises retransmission without using CBGs.
25. The method of embodiment 24, wherein:
the initial portion includes a first slot comprising one or more initial mini-slots and one or more subsequent mini-slots; and
the PUSCH resource allocation is within the subsequent mini-slots.
26. The method of any of embodiments 22-25, wherein the control message comprises a downlink control indicator (DCI) received on a physical downlink control channel (PDCCH).
27. The method of embodiment 26, wherein the DCI comprises a CBG transmission information (CBGTI) field.
28. The method of embodiment 27, further comprising receiving a Radio Resource Control (RRC) message indicating that subsequent control messages that include PUSCH resource allocations will also include the CBGTI field.
29. A network node configured to receive a physical uplink shared channel (PUSCH) in a cell of a time-division-duplexed (TDD) radio access network (RAN), the network node comprising:
communication circuitry configured to communicate with the UEs; and
processing circuitry operatively associated with the communication circuitry and configured to perform operations corresponding to the methods of any of exemplary embodiments 1-21.
30. A user equipment (UE) configured to transmit on a physical uplink shared channel (PUSCH) in a cell of a time-division-duplexed (TDD) radio access network (RAN), the UE comprising:
communication circuitry configured to communicate with a network node serving the cell; and
processing circuitry operatively associated with the communication circuitry and configured to perform operations corresponding to the methods of any of exemplary embodiments 22-28.
31. A non-transitory, computer-readable medium storing computer-executable instructions that, when executed by at least one processor of a network node, configure the network node to perform operations corresponding to the methods of any of exemplary embodiments 1-21.
32. A non-transitory, computer-readable medium storing computer-executable instructions that, when executed by at least one processor of a user equipment (UE), configure the UE to perform operations corresponding to the methods of any of exemplary embodiments 22-28.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for receiving a physical uplink shared channel, PUSCH, in a cell of a radio access network applying time-division-duplex communication, the method being performed by a base station serving the cell, the method comprising:
   determining whether remote base station interference, RI, is present for PUSCH transmissions in the cell, the determining whether RI is present including determining that a fraction of consecutive coding attempts of code block groups, CBG, are unsuccessful;
   based on the determining result, configuring one of activation and deactivation of CBG based retransmissions in the cell, the activation of CBG-based retransmissions is configured when it is determined that RI is present for PUSCH transmissions in the cell, the deactivation of CBG-based retransmissions is configured upon determining that RI is no longer present for PUSCH transmissions in the cell;
   if the base station determines that RI is present:
      transmitting, to an aggressor node, RI management reference signals (RIM-RS) indicating the presence of RI;
   sending control messages to one or more user equipment, UEs, in the cell, for applying the configuration; and
   decoding subsequent PUSCH transmissions received from the one or more UEs based on the configuration.

2. The method according to claim 1, wherein determining whether RI is present comprises determining that RI is present when receiving RI management reference signals, RIM-RS, transmitted by one or more further base stations in the radio access network.

3. The method according to claim 1, wherein determining whether RI is present when CBG-based retransmissions are activated comprises determining that first code blocks of a PUSCH transport block following a guard period of a downlink to uplink switch are repeatedly retransmitted.

4. The method according to claim 1, wherein determining whether RI is present comprises determining that RI is present when receiving RI management reference signals, RIM-RS, transmitted by one or more further base stations in the radio access network.

5. The method according to claim 4, wherein determining whether RI is present when CBG-based retransmissions are activated comprises determining that first code blocks of a PUSCH transport block following a guard period of a downlink to uplink switch are repeatedly retransmitted.

6. The method according to claim 1, wherein determining whether RI is present comprises determining that RI is present when receiving RI management reference signals, RIM-RS, transmitted by one or more further base stations in the radio access network.

7. The method according to claim 1, wherein determining whether RI is present when CBG-based retransmissions are activated comprises determining that first code blocks of a PUSCH transport block following a guard period of a downlink to uplink switch are repeatedly retransmitted.

8. A base station configured to receive a physical uplink shared, PUSCH, in a cell of a radio access network applying time-division-duplex communication, the base station serving the cell and comprising:
   communication circuitry configured to communicate with UEs of the cell; and
   processing circuitry operatively associated with the communication circuitry and configured to perform the following operations:
      determine whether remote base station interference, RI, is present for PUSCH transmissions in the cell, the determining whether RI is present including determining that a fraction of consecutive coding attempts of code block groups, CBG, are unsuccessful;
      based on the determining result, configure one of activation and deactivation of CBG based retransmissions in the cell, the activation of CBG-based retransmissions is configured when it is determined that RI is present for PUSCH transmissions in the cell, the deactivation of CBG-based retransmissions is configured upon determining that RI is no longer present for PUSCH transmissions in the cell;
      if the base station determines that RI is present:
         transmitting, to an aggressor node, RI management reference signals (RIM-RS) indicating the presence of RI;
      send control messages to one or more user equipment, UEs, in the cell, for applying the configuration; and
      decode subsequent PUSCH transmissions received from the one or more UEs based on the configuration.

9. The base station according to claim 6, wherein the processing circuitry is further configured to determine whether RI is present by determining that RI is present when receiving RI management reference signals, RIM-RS, transmitted by one or more further base stations in the radio access network.

10. The base station according to claim 8, wherein the processing circuitry is further configured to determine whether RI is present when CBG-based retransmissions are activated by determining that first code blocks of a PUSCH transport block following a guard period of a downlink to uplink switch are repeatedly retransmitted.

11. The base station according to claim 8, wherein the processing circuitry is further configured to determine whether RI is present by determining that RI is present when receiving RI management reference signals, RIM-RS, transmitted by one or more further base stations in the radio access network.

12. The base station according to claim 11, wherein the processing circuitry is further configured to determine whether RI is present when CBG-based retransmissions are activated by determining that first code blocks of a PUSCH transport block following a guard period of a downlink to uplink switch are repeatedly retransmitted.

13. The base station according to claim 8, wherein the processing circuitry is further configured to determine whether RI is present when CBG-based retransmissions are activated by determining that first code blocks of a PUSCH transport block following a guard period of a downlink to uplink switch are repeatedly retransmitted.

* * * * *